United States Patent
Yajima et al.

(10) Patent No.: US 10,409,467 B2
(45) Date of Patent: Sep. 10, 2019

(54) PRESENTATION CONTROL DEVICE AND PRESENTATION CONTROL SYSTEM

(71) Applicant: PANASONIC INTELLECTUAL PROPERTY MANAGEMENT CO., LTD., Osaka (JP)

(72) Inventors: Hideaki Yajima, Tokyo (JP); Satoshi Kajita, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 853 days.

(21) Appl. No.: 14/412,322

(22) PCT Filed: Jun. 21, 2013

(86) PCT No.: PCT/JP2013/003905
§ 371 (c)(1),
(2) Date: Dec. 31, 2014

(87) PCT Pub. No.: WO2014/017017
PCT Pub. Date: Jan. 30, 2014

(65) Prior Publication Data
US 2015/0169205 A1    Jun. 18, 2015

(30) Foreign Application Priority Data
Jul. 25, 2012    (JP) .................. 2012-164325

(51) Int. Cl.
*G06F 3/048* (2013.01)
*G06F 3/0484* (2013.01)
(Continued)

(52) U.S. Cl.
CPC ........ *G06F 3/04845* (2013.01); *G06F 3/0481* (2013.01); *G06F 3/04847* (2013.01);
(Continued)

(58) Field of Classification Search
CPC .................. G06F 3/048–04886; G06F 9/4443
See application file for complete search history.

(56) References Cited

U.S. PATENT DOCUMENTS

| 5,631,825 A | 5/1997 | van Weele et al. |
| 8,320,884 B1 * | 11/2012 | Khanna ............. H04M 1/72577 340/506 |

(Continued)

FOREIGN PATENT DOCUMENTS

| JP | 09-503086 A | 3/1997 |
| JP | 2000-293285 A1 | 10/2000 |

(Continued)

OTHER PUBLICATIONS

International Search Report for Application No. PCT/JP2013/003905 dated Sep. 17, 2013.

*Primary Examiner* — Hua Lu

(57) ABSTRACT

Provided is a presentation control device which, in a movement of a window between displays, appropriately controls a positioning of a window to be moved after the movement without a user designating a presentation location upon a movement destination display. With this device, a layout storage unit (1008) retains one or more layout patterns which establish a presentation region, formed from a presentation location and a presentation size of each window which is presented upon a display. Using the layout pattern, a layout determination unit (1007) determines a presentation region wherein it is possible to present a moved window. A presentation control unit (1002) generates presentation data which positions the moved window in a presentation location which the layout determination unit (1007) has established.

14 Claims, 11 Drawing Sheets

DISPLAY A

DISPLAY B

(51) Int. Cl.
   *G09G 5/14* (2006.01)
   *G06F 3/0481* (2013.01)
   *G06F 3/14* (2006.01)

(52) U.S. Cl.
   CPC ............ *G06F 3/1423* (2013.01); *G09G 5/14* (2013.01); *G06F 2203/04803* (2013.01); *G09G 2340/0464* (2013.01); *G09G 2340/14* (2013.01)

(56) References Cited

U.S. PATENT DOCUMENTS

| | | | | |
|---|---|---|---|---|
| 8,897,764 | B2* | 11/2014 | Takikawa | H04W 4/046 455/418 |
| 2003/0070061 | A1* | 4/2003 | Wong | G06F 8/38 712/220 |
| 2006/0050337 | A1* | 3/2006 | Hitaka | G06F 17/24 358/537 |
| 2006/0256094 | A1* | 11/2006 | Inagaki | G01C 21/3611 345/173 |
| 2007/0162953 | A1 | 7/2007 | Bolliger et al. | |
| 2009/0171529 | A1 | 7/2009 | Hayatoma | |
| 2010/0117810 | A1* | 5/2010 | Hagiwara | G06F 3/0483 340/425.5 |
| 2011/0260997 | A1 | 10/2011 | Ozaki | |
| 2012/0139947 | A1 | 6/2012 | Kishima et al. | |
| 2012/0320031 | A1* | 12/2012 | Fujiwaka | G06F 3/14 345/418 |
| 2013/0013148 | A1* | 1/2013 | Park | G07C 5/00 701/36 |
| 2013/0080939 | A1* | 3/2013 | Reeves | G06F 3/1438 715/761 |
| 2013/0137415 | A1* | 5/2013 | Takikawa | H04W 4/046 455/418 |
| 2013/0275899 | A1* | 10/2013 | Schubert | G06F 3/0481 715/765 |
| 2013/0293452 | A1* | 11/2013 | Ricci | G02B 27/01 345/156 |
| 2015/0178034 | A1* | 6/2015 | Penilla | G06Q 20/18 345/1.1 |

FOREIGN PATENT DOCUMENTS

| | | |
|---|---|---|
| JP | 2007-533015 A | 11/2007 |
| JP | 2008-122783 A | 5/2008 |
| JP | 2008-146495 A | 6/2008 |
| JP | 2009-154647 A | 7/2009 |
| JP | 2011-204023 A | 10/2011 |
| JP | 2011-227821 A | 11/2011 |
| JP | 2012-118832 A | 6/2012 |

* cited by examiner

| | SIZE (WIDTH × HEIGHT) | WINDOW GENERATION SOURCE | WHETHER OPERATION IS ALLOWED | DISPLAYABLE SIZE | DISPLAY PRIORITY |
|---|---|---|---|---|---|
| WINDOW A | 200 × 200 | HOST APPARATUS | NO | 200 × 200<br>100 × 100 | 2 |
| WINDOW B | 100 × 100 | HOST APPARATUS | NO | 100 × 100 | 1 |
| WINDOW C | 200 × 200 | HOST APPARATUS | YES | 200 × 200 | 0 |
| WINDOW D | 200 × 200 | ANOTHER APPARATUS | YES | 200 × 200 | 1 |
| WINDOW E | 100 × 100 | ANOTHER APPARATUS | NO | 200 × 200 | 1 |
| WINDOW F | 200 × 200 | ANOTHER APPARATUS | NO | 200 × 200 | 0 |

|  | POSITION-SIZE (X, Y, WIDTH × HEIGHT) | WHETHER WINDOW FROM ANOTHER APPARATUS CAN BE DISPLAYED | WHETHER OPERATIONS ARE ALLOWED |
|---|---|---|---|
| REGION 1 | 10,60,100 × 100 | YES | NO |
| REGION 2 | 110,10,200 × 200 | NO | NO |
| REGION 3 | 320,10,200 × 200 | YES | YES |

LAYOUT PATTERN 1

FIG. 5A

|  | POSITION-SIZE (X, Y, WIDTH × HEIGHT) | WHETHER WINDOW FROM ANOTHER APPARATUS CAN BE DISPLAYED | WHETHER OPERATIONS ARE ALLOWED |
|---|---|---|---|
| REGION 1 | 10,10,200 × 200 | YES | NO |
| REGION 2 | 210,10,100 × 100 | NO | NO |
| REGION 3 | 210,110,100 × 100 | YES | NO |
| REGION 4 | 320,10,200 × 200 | YES | YES |

LAYOUT PATTERN 2

FIG. 5B

| | WHETHER OPERATIONS ARE ALLOWED | DISPLAY PRIORITY |
|---|---|---|
| ALL WINDOWS | FOLLOW SETTING CONTENTS OF APPLICATION | FOLLOW SETTING CONTENTS OF APPLICATION |

STOPPED STATE

FIG. 13A

| | WHETHER OPERATIONS ARE ALLOWED | DISPLAY PRIORITY |
|---|---|---|
| WINDOW A | FOLLOW SETTING OF APPLICATION | FOLLOW SETTING OF APPLICATION |
| WINDOW B | FOLLOW SETTING OF APPLICATION | FOLLOW SETTING OF APPLICATION |
| WINDOW C | FOLLOW SETTING OF APPLICATION | FOLLOW SETTING OF APPLICATION |
| OTHER WINDOWS | NO | −1 |

RUNNING STATE

FIG. 13B

PRESENTATION CONTROL DEVICE AND PRESENTATION CONTROL SYSTEM

TECHNICAL FIELD

The present invention relates to a display control apparatus that displays display data on a display, and more particularly, relates to a display control apparatus that controls a display position of data moved between a plurality of displays in a system provided with a plurality of displays, and also to a display control system.

BACKGROUND ART

As a conventional system including a plurality of displays, there is a system in which a plurality of terminals connected via a network share a screen and display the screen (e.g., see Patent Literature (hereinafter, referred to as "PTL") 1).

In the system disclosed in PTL 1, the window (screen) displayed on a first display is operated and thereby moved from the first display to a second display. More specifically, PTL 1 discloses that the user drags the screen displayed on his or her own terminal and moves to the screen on another display.

CITATION LIST

Patent Literature

PTL 1
Japanese Patent Application Laid-open No. 2000-293285

SUMMARY OF INVENTION

Technical Problem

The configuration according to the conventional system, however, has a problem in that the user has to indicate the display position on the second display (display position after movement) when moving the window from the first display to the second display, which is a troublesome operation. When another window is already displayed on the second display, which is the moving destination of the window, depending on the display position of the moving target window, the window may made it hard to see required information. For this reason, it is necessary to indicate the display position of the window to be moved during the operation to move the window, in order for the required information to be displayed appropriately.

An object of the present invention is to provide a display control apparatus and a display control system which appropriately control the position where a moving target window is placed after the window moves, without requiring the user to indicate the display position on the moving destination display during movement of the window between the displays.

Solution to Problem

A display control apparatus according to an aspect of the present invention is a display control apparatus that controls display contents on a display, the apparatus including: a management section that holds management information for managing, in window units, display target data managed by the display control apparatus, the window units being virtual regions for displaying the display target data on the display; a receiving section that receives a moving window managed by another display control apparatus; a layout storage section that holds at least one layout pattern defining at least one display region including a display position and display size of each window to be displayed on the display and that includes information indicating whether the display region is capable of displaying the moving window; a layout determining section that determines a display region capable of displaying the moving window, using the management information and the layout pattern held by the layout storage section, and that determines a display position of the moving window; a display control section that generates display data for which the moving window is placed at the display position, in accordance with the display position determined by the layout determining section; and a display section that outputs the display data generated by the display control section to the display.

With this configuration, a layout pattern that specifies the position where a window is placed on a display is previously held, and the display position where a moving target window is displayed can be determined using this layout pattern.

Advantageous Effects of Invention

According to the present invention, it is made possible to appropriately control the position where a moving target window is placed after the window moves, without requiring the user to indicate the display position on the moving destination display during movement of the window between the displays.

BRIEF DESCRIPTION OF DRAWINGS

FIGS. 5A and 5B are each a diagram illustrating a layout pattern example in an embodiment of the present invention;

FIGS. 13A and 13B are each an example of setting conditions held by a changing section in an embodiment of the present invention.

DESCRIPTION OF EMBODIMENTS

Hereinafter, a description will be given of an embodiment of the present invention with reference to the accompanying drawings.

(Embodiment 1)

Figure 1:
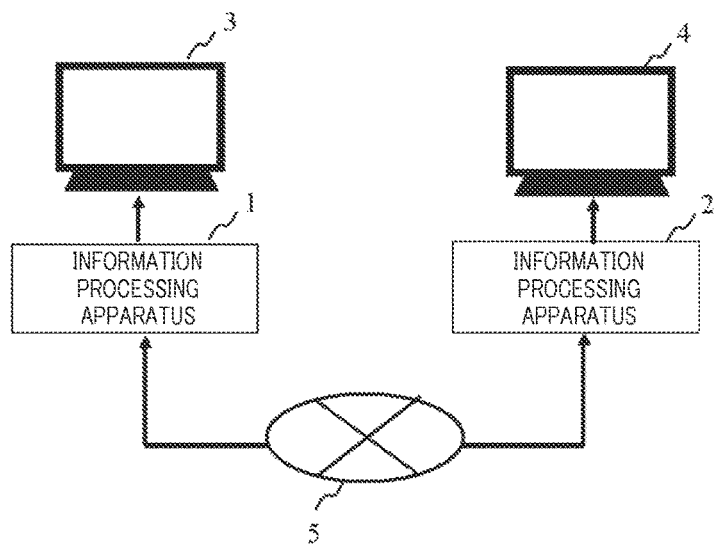
FIG. 1 is a diagram illustrating a configuration example of a display control system including a plurality of information processing apparatuses in an embodiment of the present invention.

FIG. 1 is a diagram illustrating a configuration example of a display control system including a plurality of information processing apparatuses. Each information processing apparatus includes a display control apparatus according to an embodiment of the present invention and has a function to control a display position of moved data between a display whose display contents are controlled by the information processing apparatus (hereinafter, may be referred to as "host apparatus" as opposed to "another apparatus") and another display whose display contents are controlled by another information processing apparatus.

In FIG. 1, information processing apparatus 1 is connected to display (display apparatus) 3. Information processing apparatus 1 outputs the contents to be presented to the user to display 3 as display data and controls the display contents of display 3. Information processing apparatus 1 treats data to be managed and displayed on display 3 in window units and allows data to be moved on a display in window units.

Information processing apparatus 2 is connected to display (display apparatus) 4. Information processing apparatus 2 outputs the contents to be presented to the user to display 4 as display data and controls the display contents of display 4. Information processing apparatus 2 treats data to be managed and displayed on display 3 in window units and allows data to be moved on a display in window units.

Information processing apparatuses 1 and 2 are connected to each other via network 5.

Network 5 can be a wired link or a wireless link or a combination of the wired and wireless links. Network 5 may be a local network such as a LAN (Local Area Network). Network 5 may be directly connected to the apparatuses using a bus type interconnection. In addition, network 5 may use a serial communication or USB (Universal Serial Bus).

Information processing apparatuses 1 and 2 transmit and receive information on a moving target window via network 5 during window movement between displays 3 and 4.

The physical installation positions of displays 3 and 4 can be anywhere as long as the two displays can be operated and visually observed by a single user. More specifically, displays 3 and 4 are placed adjacent to each other. In addition, displays 3 and 4 are placed with another apparatus interposed therebetween or are placed apart from each other.

The display control system according to Embodiment 1 may be an in-vehicle system including a plurality of displays and configured to output the contents to be presented to the user as display data and to display the contents on the plurality of displays. In addition, the display control system of Embodiment 1 may be a home network system including a combination of a plurality of home appliances. Moreover, the display control system of Embodiment 1 may be an AV system including a combination of a plurality of AV devices. In addition, the display control system of Embodiment 1 may be a system including a combination of a plurality of devices including a mobile terminal such as a tablet terminal or portable phone.

Figure 2:
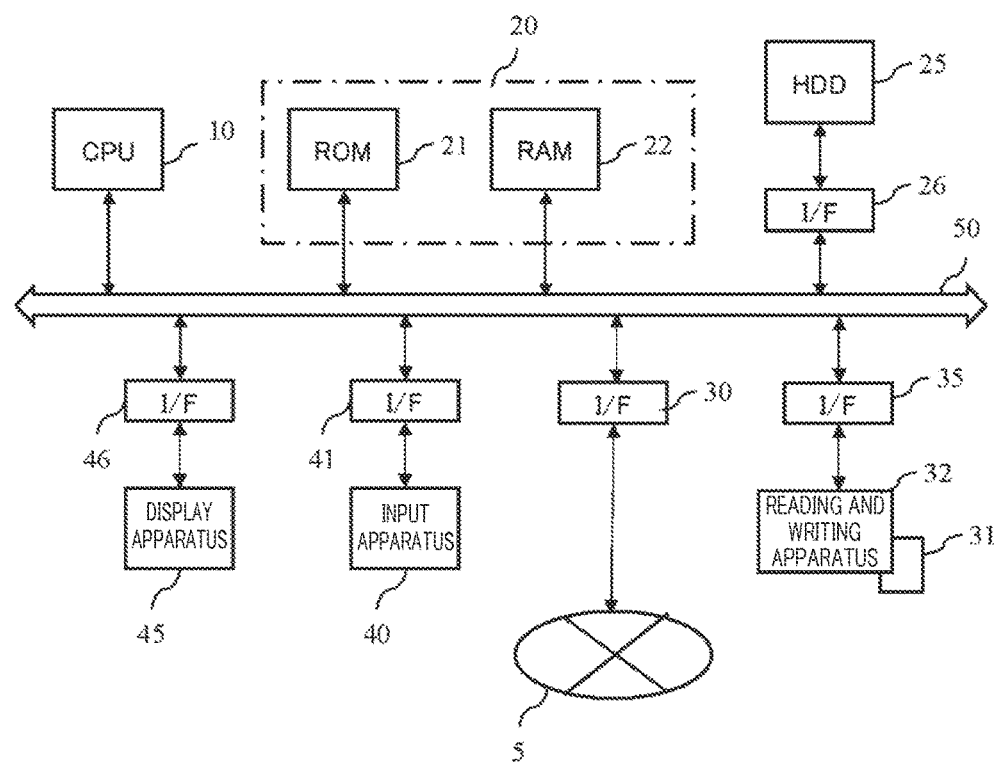
FIG. 2 is a diagram illustrating a hardware configuration example of an information processing apparatus including a display control apparatus in an embodiment of the present invention.

FIG. 2 is a diagram illustrating a hardware configuration of an information processing apparatus including the display control apparatus of Embodiment 1 of the present invention. The information processing apparatus is an in-vehicle terminal, AV device, home appliance, tablet terminal, portable phone, or portable information terminal, for example.

The information processing apparatus includes a CPU (Central Processing Unit) 10, memory apparatus 20, hard disk apparatus 25, reading and writing apparatus 32, input apparatus 40, and display apparatus 45. Theses apparatuses are connected to each other via bus line 50. Hard disk apparatus 25, reading and writing apparatus 32, input apparatus 40, and display apparatus 45 are connected to bus line 50 via interfaces 26, 35, 41, and 46, respectively. In addition, the information processing apparatus is connected to network 5 in FIG. 1 via interface 30.

CPU 10 may be a single CPU or a plurality of CPUs. FIG. 1 illustrates an example in which CPU 10 is a single CPU.

Memory apparatus 20 includes ROM (Read Only Memory) 21 and RAM (Random Access Memory) 22. ROM 21 stores therein a computer program and data that prescribe the operation of CPU 10. The computer program and data may be stored in hard disk apparatus 25. CPU 10 executes the processing prescribed by the computer program, while writing the computer program and data stored in ROM 21 or hard disk apparatus 25 to RAM 22 as appropriate. RAM 22 also functions as a medium for temporarily storing the data generated in association with the processing executed by CPU 10. Memory apparatus 20 includes a nonvolatile memory, which is rewritable and capable of keeping stored contents even when the power is turned off, such as a flash memory, and a storage medium.

Hard disk apparatus 25 is an apparatus that records and stores therein a content program and content data. The content data herein is map data when the information processing apparatus has a navigation function, for example. In addition, when the information processing apparatus has an audio playback function, for example, the content data is audio data. Note that, the content data can be recorded on RAM 22 (nonvolatile memory).

Reading and writing apparatus 32 is an apparatus that writes and reads data including the contents recorded on portable recording medium 31. Examples of portable recording medium 31 include an SD (Secure Digital) card, CD (Compact Disc) card, BD (Blu-ray (registered trademark) Disc), and memory card.

Input apparatus 40 receives input from the user and outputs the input as an operation input signal and includes a touch panel, input button, operation key, keyboard and mouse, for example. In addition, input apparatus 40 may be a remote control apparatus, and in this case, input apparatus 40 is not directly connected to bus line 50. Moreover, input apparatus 40 may be a sensor apparatus and receive a noncontact operation from the user (e.g., gesture).

Display apparatus 45 is an apparatus that displays display data to be indicated to the user and corresponds to displays 3 and 4 in FIG. 1. Display apparatus 45 is an LCD (Liquid Crystal Display), for example.

As has been described above, the information processing apparatus is configured as a computer. The computer program may be provided via ROM 21, hard disk apparatus 25, a flexible disk (not illustrated), or portable recording medium 31, or via a transmission medium such as network 5, for example. For example, the computer program recorded on portable recording medium 31 can be read by connecting information writing apparatus 32 to the information processing apparatus. Moreover, the read computer program can be stored on RAM 22 or hard disk apparatus 25.

When a computer program is provided from ROM 21 as a program recording medium, installing this ROM 21 in the information processing apparatus allows CPU 10 to execute the processing in accordance with the computer program described above.

The computer program supplied via a transmission medium such as network 5 is received via interface 30 and stored in RAM 22 or hard disk apparatus 25, for example. The transmission medium is by no means limited to a wired transmission medium, and may be a wireless transmission medium.

Note that, in FIG. 2, the information processing apparatus is configured to include input apparatus 40 and display apparatus 45 but may be provided with only a communication port and configured without input apparatus 40 and display apparatus 45. In this configuration, input apparatus 40 or display 45 may be provided to the information processing apparatus as an external device.

Hereinafter, a description will be given under the assumption that the information processing apparatus is an in-vehicle terminal in which the input apparatus is a touch panel, and that the display control system is an in-vehicle system including two information processing apparatuses.

Figures 3, 4:
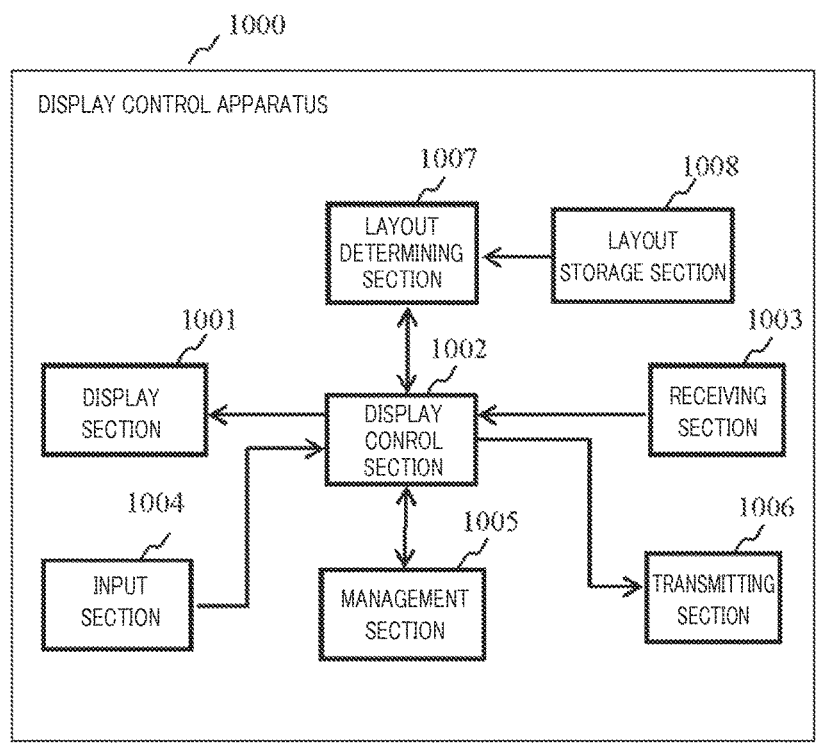
FIG. 3 is a block diagram illustrating a configuration example of a display control apparatus in an embodiment of the present invention.
FIG. 4 is a diagram illustrating an example of window management information in an embodiment of the present invention.

FIG. 3 is a block diagram illustrating a configuration of the display control apparatus in Embodiment 1 of the present invention. The display control apparatus is a program that can be operated by CPU 10 using memory apparatus 20 illustrated in FIG. 2.

Display control apparatus 1000 outputs the contents outputted by one or more applications that can be operated by the information processing apparatus (contents to be presented to the user) to a display as display data and controls the display contents of the display.

Display control apparatus 1000 manages data to be displayed on a display in window units, which are virtual regions for displaying the data.

Display control apparatus 1000 associates a single window with a single application and draws the contents outputted by the application program on the window (virtual region) associated with the application program.

Display control apparatus 1000 determines the display position and display size on the display for each window under management and outputs display data for which the window is placed at the determined position, thus controlling the display contents on the display.

Note that, display control apparatus 1000 may associate two or more windows with a single application. In addition, display control apparatus 1000 allows for a moving operation on a display in window units.

Display control apparatus 1000 includes display section 1001, input section 1004, display control section 1002, management section 1005, receiving section 1003, transmitting section 1006, layout determining section 1007, and layout storage section 1008.

Display section 1001 outputs display data to the display (display apparatus 45 of FIG. 2, display of FIG. 1) in accordance with an instruction from display control section 1002, thereby displaying the display data on the display.

Input section 1004 receives an operation input signal outputted from input apparatus 40 of FIG. 2 and indicates the user operation information to display control section 1002. As described above, input apparatus 40 receives input from the user and outputs the input to input section 1004 as an operation input signal.

Display control section 1002 determines the display position and display size on the display for each window under management, in accordance with the user operation information indicated by input section 1004.

Display control section 1002 generates display data for which a window is placed at the determined display position, thereby controlling the contents of display data outputted by display section 1001.

Note that, display control section 1002 sends a query to the layout determining section 1007 before generating and displaying a new window and determines the display positions and display sizes of the display target windows including the new window on the display.

In addition, display control section 1002 performs processing for inter-display (between displays) movement when determining that the display position of the window managed by display control section 1002 has moved out of the display region of the display based on the user operation information indicated by input section 1004.

First, display control section 1002 requests transmitting section 1006 to indicate moving of the moving target window to another display control apparatus which is the moving destination.

Next, display control section 1002 generates display data not including a moving target window and requests display section 1001 to output the generated display data.

Note that, display control section 1002 may send a query to layout determining section 1007 before generating display data not including a moving target window and re-determine the display position and display size of another window not including a moving target window on the display.

Display control section 1002 receives an indication of moving of the window from another display control apparatus via receiving section 1003. Display control section 1002 determines that the display position of the window managed by another display control apparatus has moved to the display region of the display managed by the host apparatus and performs processing for inter-display (between displays) movement.

More specifically, display control section 1002 first receives an indication of moving of a window from another display control apparatus which is the moving source from receiving section 1003. Next, display control section 1002 sends a query to layout determination section 1007 about the display position where the moving window is displayed. Next, display control section 1002 receives a result of determination made by layout determining section 1007 and determines the display position and display size on the display for the moving window. Display control section 1002 generates display data for which the moving window is placed at the determined display position, thereby controlling the contents of display data to be outputted from display section 101.

Management section 1005 holds the management information for the window managed by display control apparatus 1000. Display control apparatus 1000 manages data to be displayed on the display in window units, which are virtual regions for displaying data. In addition, display control apparatus 1000 includes a drawing buffer for a window, and the contents outputted from the application program (contents to be presented to the user) are held as drawing data.

FIG. 4 illustrates an example of window management information held by management section 1005. As illustrated in FIG. 4, the window management information includes a size, window generation source, whether operations are allowed, displayable size, and display priority.

The size in the management information is a display size currently used on the display. In the case of a moving window indicated by another apparatus, the size in the management information is set to the display size on the moving source display as the initial setting value. When a new window is generated, the display size specified by the application during the generation of the window is set to the initial setting value. In addition, when the size of the window being displayed is changed by a user operation, for example, the size in the management information is set to the display size after the change.

The window generation source in the management information is information indicating whether or not the window is a window that has moved from another apparatus.

Whether operations are allowed in the management information is information indicating whether the user is allowed to perform the operations of the window via input section 1004. For example, the user is allowed to perform the operations of the window of the menu screen, so that whether operations are allowed in the management information is "YES." Meanwhile, the user is not allowed to perform the operations for the display screen of the remaining amount of gasoline or speed meter, so that whether operations are allowed in the management information is "NO."

The displayable size in the management information is information indicating the displayable size for the window on the display. The displayable size in the management information holds one or more displayable sizes when it is possible to display the window in a size other than the currently used display size (size in management information).

The display priority in the management information is information indicating with what priority the window is to be displayed on the display. For example, warning notice windows are important display contents for the user, so that the display priority for the windows in the management information is high. When the area of the display region of a display is in size that cannot display all the windows simultaneously, display control section 1002 generates display data in descending order of the priorities of the windows as display targets.

Layout storage section 1008 previously holds one or more layout patterns each defining the arrangement of windows on the display. The layout pattern defines one or more display regions each including a display position and display size of a window to be displayed on the display.

FIGS. 5A and 5B each illustrate an example of a layout pattern held by layout storage section 1008. As illustrated in FIGS. 5A and 5B, each layout pattern includes one or more regions for displaying windows, and also includes, for each region, information indicating a display position and display size on the display, and whether it is possible to display a moving window from another apparatus, and whether the user is allowed to perform the window operations.

Layout pattern 1 illustrated in FIG. 5A is a layout pattern in which three windows are arranged, and a moving window from another apparatus can be displayed in regions 1 and 3. Layout pattern 2 illustrated in FIG. 5B is a layout pattern in which four windows are arranged, and a moving window from another apparatus can be displayed in regions 1, 3 and 4.

Layout determining section 1007 receives a query from display control section 1002 when displaying a new window by the host apparatus, and when displaying a moving window from another apparatus.

Layout determining section 1007 determines in which layout region of which layout pattern a new window or moving window is placed from among the layout patterns held in layout storage section 1008 using the window management information.

Layout determining section 1007 indicates the result of determination to display control section 1002. More specifically, layout determining section 1007 selects a region where a new window or moving window can be displayed with the layout pattern currently in use based on the management information on the new window or moving window.

Layout determining section 1007 indicates a determination result to display control section 1002. Meanwhile, when determining that the window cannot be displayed in any region of the layout pattern currently in use, layout determining section 1007 selects another layout pattern from among the layout patterns held in layout storage section 1008. The other layout pattern to be selected is a layout pattern in which all the windows currently being displayed and the new window or moving window can be displayed.

Layout determining section 1007 indicates a determination result to display control section 1002, and display control section 1002 switches the layout pattern to a new layout pattern and generates display data for which each window is placed. When an appropriate layout pattern cannot be selected from among the layout patterns held in layout storage section 1008, layout determining section 1007 indicates an error to display control section 1002 as a determination result.

Figure 6:
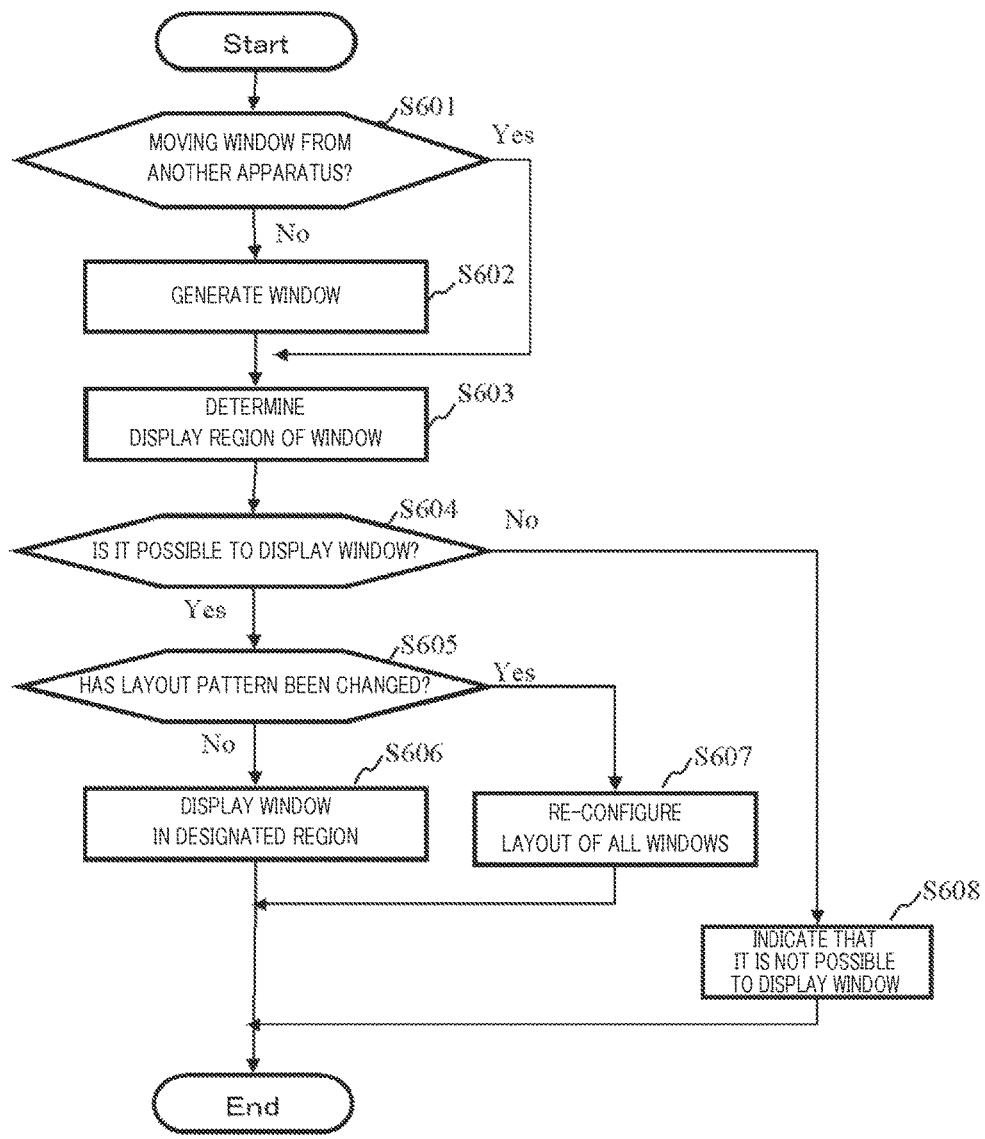
FIG. 6 is a flowchart illustrating an example of an operation to newly display a window performed by a display control apparatus in an embodiment of the present invention.

FIG. 6 is a flowchart illustrating an example of operation to newly display a window by a display control apparatus in Embodiment 1 of the present invention. The display control apparatus starts processing when an application displays a new window in the host apparatus or when a moving window is indicated from another apparatus.

First, display control section 1002 determines whether the window to be newly displayed is a new window to be displayed by an application of the host apparatus or a moving window indicated by another apparatus via receiving section 1003 (S601).

When the window to be newly displayed is a window of the host apparatus (S601: No), display control section 1002 generates a new window in accordance with the instruction from an application of the host apparatus (S602). Display control section 1002 sets the window management information to indicate that the window to be newly displayed is not a window indicated from another apparatus.

Meanwhile, when the window to be newly displayed is a moving window indicated by another apparatus (S601: Yes), the window received by receiving section 1003 is used without modification, and the processing to generate a window is omitted. Display control section 1002 sets the window management information to indicate that the window to be newly displayed is a window indicated from another apparatus.

Next, display control section 1002 indicates the information on the window to be newly displayed and sends a query to layout determining section 1007. Layout determining section 1007 determines a display region of the window to be newly displayed (S603). The processing to determine the window display region is omitted herein but will be described hereinafter.

Next, layout determining section 1007 indicates a result of determining the display region of the window to be newly displayed to display control section 1002. Display control section 1002 determines whether or not it is possible to display the window, based on the indicated result of determination (S604).

When the window cannot be displayed (when the result of determination is an error) (S604: No), display control section 1002 indicates to the user that the window cannot be displayed (S608).

For example, there may be a display error when an application of the host apparatus is instructed to newly display a window after reception of a user input operation via input section 1004. Display control section 1002 displays a message indicating that "the designated window cannot be displayed at this time" on the display via display section 1001.

Moreover, there may a display error when a moving window is indicated from another apparatus via receiving section 1003. Display control section 1002 indicates to the other apparatus, which is the moving source, that the window cannot be moved. The display control apparatus of the moving source that has received the indication that the window cannot be moved displays a message indicating that "the designated window cannot be displayed at this time" on the display via display section 1001 of the display control apparatus of the moving source. In addition, the display control apparatus of the moving source returns the moving target window to the display state before movement.

Meanwhile, when it is possible to display the window (S604: Yes), display control section 1002 determines whether or not the layout pattern has been changed (S605). When the result of determination indicated from layout determining section 1007 is an error, display control section determines that the window cannot be displayed.

When the determination result indicated by layout determining section 1007 designates only the display region of the window to be newly displayed, this means that the layout pattern has not been changed. When the determination result indicated by layout determining section 1007 designates the display regions of all windows including the window to be newly displayed, this means that the layout pattern has been changed.

When the layout pattern has not been changed (S605: No), display control section 1002 generates display data for which a window to be newly displayed is placed in accordance with a display position and display size for the window to be newly displayed which are indicated as a determination result. Display control section 1002 outputs the generated display data to display section 1001, thereby displaying the window (S606).

Note that, when the window display size before sending a query to layout determining section 1007 is different from the display size indicated as a determination result from layout determining section 1007, the size of the window needs to be changed. Display control section 1002 generates display data in accordance with the display size indicated by layout determining section 1007.

Meanwhile, when the layout pattern has been changed (S605: Yes), display control section 1002 receives, as a determination result, the display positions and display sizes of all the windows including the window to be newly displayed. Display control section 1002 generates display data for which all the windows are placed, at a designated region in accordance with the determination result. Display control section 1002 outputs the generated display data to display section 1001, thereby displaying the windows (S607).

Note that, when the window display size before sending a query to layout determining section 1007 is different from the display size indicated as a determination result from layout determining section 1007, the size of the window needs to be changed. Display control section 1002 generates display data in accordance with the display size indicated by layout determining section 1007.

In addition, in the present embodiment, when a window is moved from another display control apparatus, the processing to generate a window in the moving destination display control apparatus is omitted by indicating the window itself In terms of reducing the communication volume, only information required for generating a window may be indicated to allow the display control apparatus of the moving destination to generate a moving window based on the indicated information.

Figure 7:
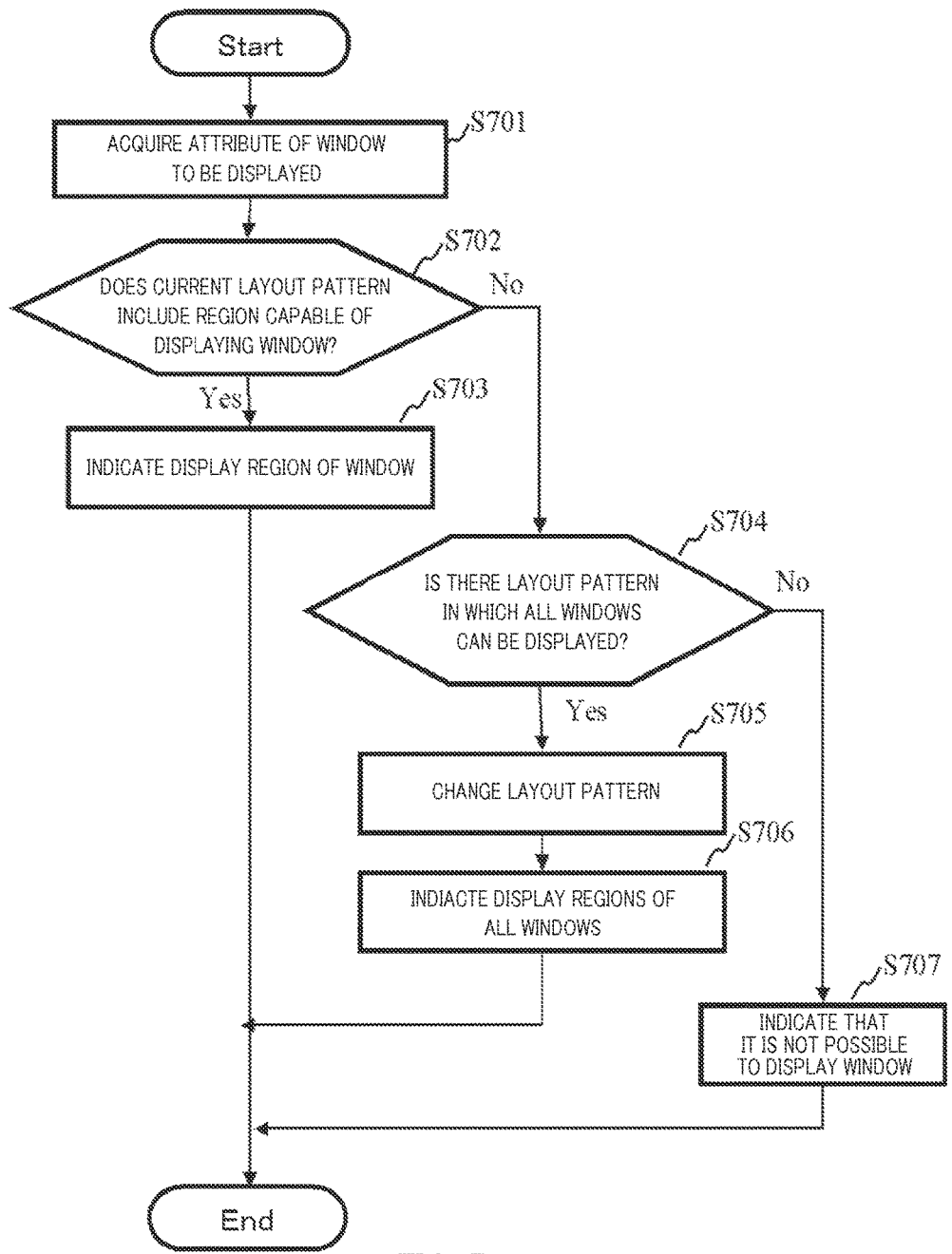
FIG. 7 is a flowchart illustrating an example of an operation to determine a window display region performed by a layout determination section in an embodiment of the present invention.

FIG. 7 is a flowchart illustrating an example operation to determine a window display region by layout determining section 1007 (details of S603 in FIG. 6) in the present embodiment of the present invention. Layout determining section 1007 receives a query from display control section 1002 and starts processing to determine a display position and display size of a window.

First, layout determining section 1007 acquires information on a window to be newly displayed from display control section 1002 (S701). This information on the window is the same as the window management information held by management section 1005 and includes the window size, window generation source, whether operations are allowed, a displayable size, and display priority.

Next, layout determining section 1007 determines whether there is a region where a window to be newly displayed can be displayed with the layout pattern currently in use (S702).

More specifically, layout determining section 1007 first compares the information on the window to be newly displayed (size, window generation source, whether operations are allowed, and displayable size) with information on each region of the layout pattern currently in use. The information on each region of the layout pattern includes the size, whether it is possible to display a window from another apparatus, and whether operations are allowed as illustrated in FIGS. 5A and 5B.

Next, layout determining section 1007 detects a region where the information on the window to be newly displayed can be displayed from the region of the layout pattern currently in use. Note that, layout determining section 1007 determines the region where the window from another apparatus can be displayed in the layout pattern currently in use to be a region where the window can be displayed, regardless of whether the window generation source is the host apparatus or another apparatus.

In addition, layout determining section 1007 determines the region where the operations are allowed in the layout pattern currently in use to be a region where the window can be displayed regardless of whether the operations of the window are allowed or not.

In addition, layout determining section 1007 determines that the region is a region where the window can be displayed, when the region matches one of the displayable sizes even when the size of the region does not match the size of the window to be newly displayed in the layout pattern currently in use.

Next, when there is a detected region, layout determining section 1007 compares the management information (priority) on the window currently displayed in the detected region and the information (priority) on the window to be newly displayed. When the priority of the currently displayed window is higher than the priority of the window to be newly displayed, layout determining section 1007 determines that the window to be newly displayed cannot be displayed in the region and thus searches for another region.

When another region is detected as a result of search, layout determining section 1007 compares the priorities again. When no region is detected, layout determining section 1007 determines that there is no region where the window to be newly displayed can be displayed. When the priority of the currently displayed window is lower than the priority of the window to be newly displayed or the same, layout determining section 1007 selects the region and determines the region to be the display region for the window to be newly displayed. Upon determining that the display region for the window to be newly displayed, layout determining section 1007 determines that there is a region where the window can be displayed.

When determining that there is a region where a window to be displayed can be displayed with the layout pattern currently in use (S702: Yes), layout determining section 1007 indicates the determination result to display control section 1002 (S703). Layout determining section 1007 indicates the display size and display position of the determined region as the determination result.

When determining that there is no region where a window to be displayed can be displayed with the layout pattern currently in use (S702: No), layout determining section 1007 determines whether there is another appropriate layout pattern (S704).

More specifically, layout determining section 1007 selects a layout pattern from among the layout patterns held by layout storage section 1008. Layout determining section 1007 determines whether there is a region where a window to be newly displayed can be displayed for the selected layout pattern, using the same procedure as S702. When determining that there is a region where the window can be displayed, layout determining section 1007 determines the layout pattern to be the layout pattern in which all the currently displayed windows and the window to be newly displayed can be displayed. Upon determining the layout pattern, layout determining section 1007 determines that there is a layout pattern in which all the windows can be displayed.

When determining that there is a layout pattern in which all the windows can be displayed (704: Yes), layout pattern determining section 1007 changes the layout pattern to the determined layout pattern as the current layout pattern (S705).

Layout pattern determining section 1007 indicates the determination result corresponding to the layout pattern after the change to display control section 1002 (S706). Layout pattern determining section 1007 indicates the display sizes and display positions of all the windows currently displayed and the window to be newly displayed, as a determination result on the basis of the region associated with the process of the layout pattern determination.

When determining that there is no layout pattern in which all the windows can be displayed (704: No), layout pattern determining section 1007 indicates an error (window cannot be displayed) as a determination result to display control section 1002 (S707).

FIGS. 8A to 8F illustrate an example of screen images displayed on the display via display section 1001. Using FIGS. 8A to 8F, a description will be given of a case where an application of a display control apparatus displays a window in the host apparatus.

Figure 8A:
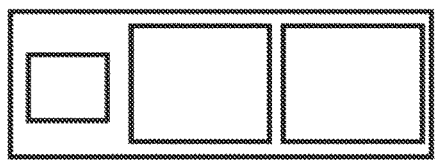
FIGS. 8A to 8F are each a diagram illustrating an example of a screen image displayed on a display in an embodiment of the present invention.

An assumption is made that layout determining section 1007 selects layout pattern 1 of FIG. 5A as the current layout pattern in the initial state. FIG. 8A is a screen image of the initial state. In the initial state, since no window is displayed, nothing is displayed on each region of the display.

Figure 8B:
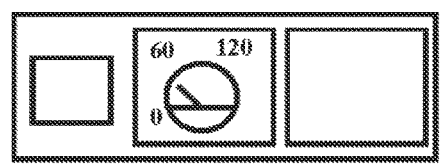

Next, the user instructs an application of the host apparatus to perform processing via input section 1004 and displays window A of FIG. 4. FIG. 8B is a screen image when window A is displayed. Since window A is for the window of the host apparatus (S601: No), display control section 1002 starts an application to display window A and generates window A (S602). Note that, in this example, an assumption is made that this application is an application for displaying a speed meter.

Next, display control section 1002 indicates the information on window A thus generated and sends a query to layout determining section 1007. Layout determining section 1007 performs the determination process illustrated in FIG. 7 (S603). In this example, window A has a size of 200×200, does not allow user operations and is not a window generated by another apparatus. Thus, window A can be displayed in regions 2 and 3 of layout pattern 1.

Layout determining section 1007 selects region 2 as a region having a higher matching degree (in the region where the operations are allowed, both windows where the operations are allowed and not allowed can be displayed, but the region where the operations are not allowed is considered as having a high matching degree to the window where the operations are not allowed. In addition, in the region where a window from another apparatus can be displayed, a window can be displayed regardless of whether the window generation source is the host apparatus or another apparatus, but the region where it is not possible to display a window from another apparatus is considered as having a higher matching degree to the window of the host apparatus). As a result, the window can be displayed (S604: Yes), and the layout pattern has not been changed (S605: No), so that window A is displayed in region 2 (see FIG. 8B).

Figure 8C:
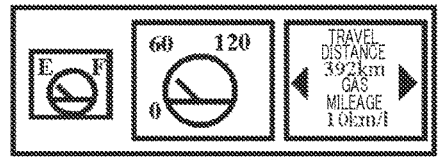
Figure 8D:
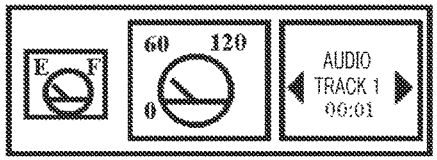

Moreover, the user instructs the application of the host apparatus to perform processing via input section 1004 and displays window B (window of fuel meter application) and window C (window of mileage display application) of FIG. 4. FIG. 8C is a screen image when windows A, B, and C are displayed. Windows B and C are displayed on regions 1 and 3, respectively.

Figure 8E:
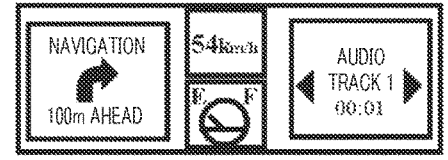
Figure 8F:
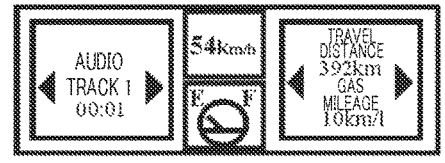
Figure 9A:
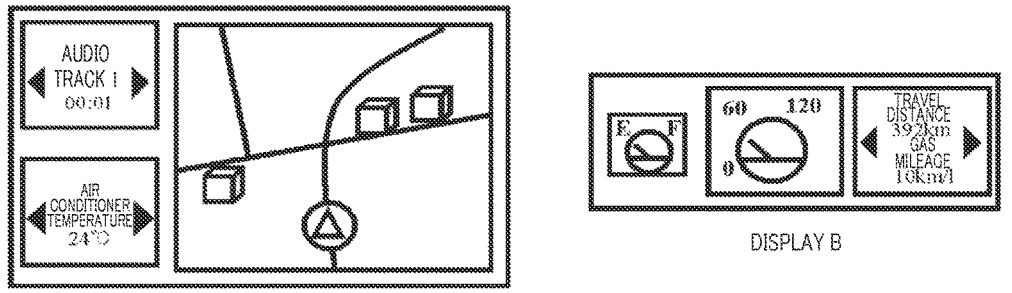
FIGS. 9A to 9C are each a diagram illustrating an example of a screen image displayed on a plurality of displays in an embodiment of the present invention.
Figure 9B:
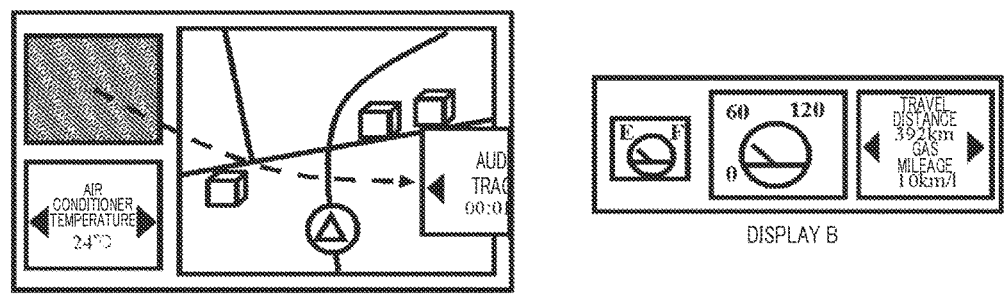
Figure 9C:
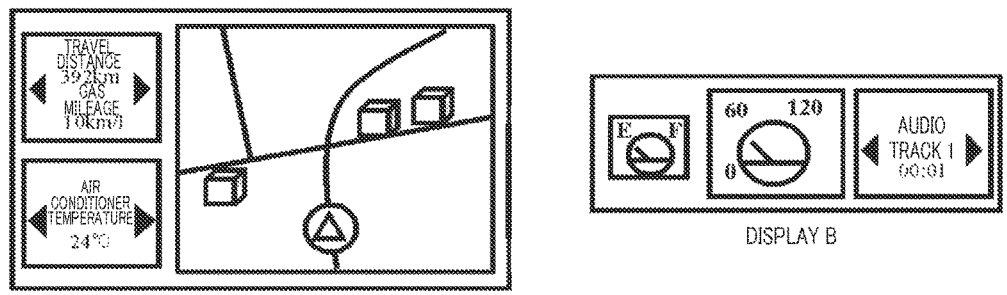

FIGS. 9A to 9C each illustrate an example of a screen image to be displayed on a display via display section 1001. Using FIGS. 9A to 9C, a description will be given of a case where the display control apparatus displays a moving window indicated by another display control apparatus. In FIGS. 9A to 9C, the display used by another display control apparatus is denoted as display A and the display used by the display control apparatus (host apparatus) described in FIGS. 8A to 8F is denoted as display B.

FIG. 9A is a screen image before a window is moved between the displays. Display B displays the same screen image as FIG. 8C, and displays windows A, B, and C of FIG. 4 as described above. FIGS. 9A to 9C illustrate a case where window D of FIG. 4 (window of audio playback application) displayed on display A moves to display B. Note that, an assumption is made that display B is located on the right side of display A as the physical installation positions of displays A and B.

FIG. 9B illustrates a situation where a touch operation is made on display A, and a drag operation to move window D to the screen edge of display A is made (right side edge in the illustrated example). More specifically, the direction of the drag operation is a direction toward display B. The display control apparatus connected to display A determines that window D has moved to the outside of the display region of the display based on the user operation information and thus sends an indication of the movement of window D to the display control apparatus to which display B is connected.

Display control section 1002 of the display control apparatus to which display B is connected receives the indication of the movement of window D of FIG. 4 (window of audio playback application) from the other display control apparatus to which display A is connected. Since window D is a moving window from another apparatus (S601: Yes), display control section 1002 of the display control apparatus to which display B is connected indicates the information on the moving window and sends a query to layout determining section 1007.

Layout determining section 1007 performs the determination process (S603) illustrated in FIG. 7. Window D in this example has a size of 200×200, is a window that allows user operations and is a window generated by anther apparatus so that window D can be displayed in region 3 of pattern 1.

Layout determining section 1007 compares the priorities of window C already displayed in region 3 and window D to be newly displayed. In this example, the priority of window D is higher than window C, layout determining section 1007 determines that window D to be newly displayed can be displayed in region 3 and displays window D in region 3. If the priority of window D is lower than window C, layout determining section 1007 determines that window D cannot be displayed and determines that there is no region where window D to be newly displayed can be displayed in the layout pattern currently in use.

As a result, window D can be displayed (S604: Yes), and the layout pattern has not been changed (S605: No), so that window D is displayed in region 3 (see FIG. 8D). FIG. 9C is a screen image after the window is moved between the displays. Window D that had been displayed on display A has been moved to display B.

Note that, in FIG. 9C, window C that is no longer displayed on display B because of the replacement with window D is displayed in a region of display A where window D (moving window) had been displayed in FIG. 9A. When the display control apparatus connected to display B displays window D, the display control apparatus may indicate window C as a moving window to the display control apparatus connected to display A. In addition, among the windows held by the display control apparatus connected to display A, a window that has not been displayed on display A (such as a window that has been displayed behind window D) may be displayed.

Figure 10A:
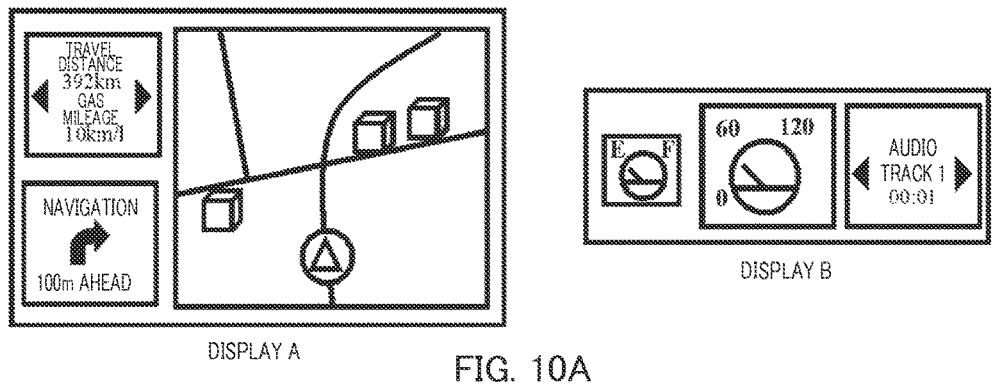
FIGS. 10A to 10C are each a diagram illustrating an example of a screen image displayed on a plurality of displays in an embodiment of the present invention.
Figure 10B:
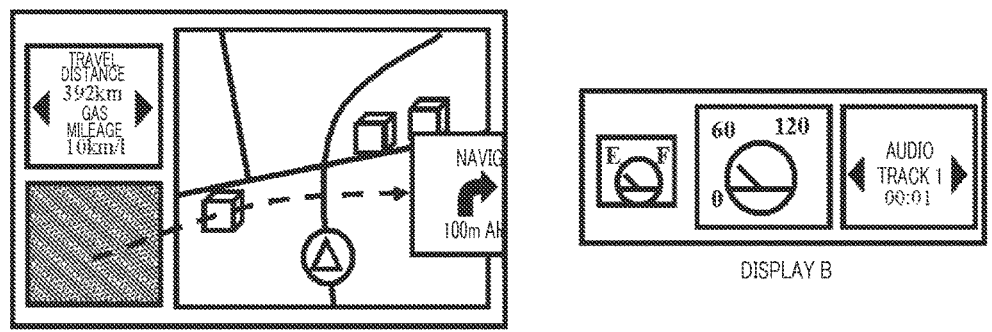
Figure 10C:
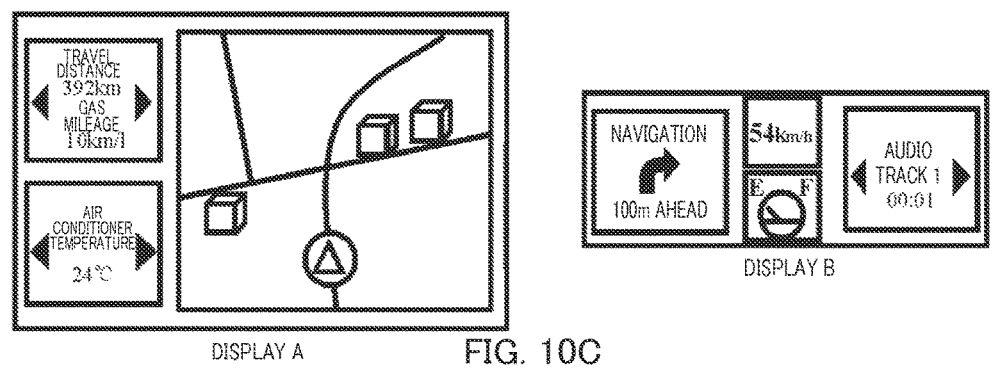

FIGS. 10A, 10B, and 10C each illustrate an example of a screen image to be displayed on a display via display section 1001. Using FIGS. 10A to 10C, a description will be given of a case where the display control apparatus displays a moving window indicated by another display control apparatus, and the layout pattern is changed. In FIGS. 10A to 10C, the display used by another display control apparatus is denoted as display A and the display used by the display control apparatus (host apparatus) described in FIGS. 8A to 8F is denoted as display B.

FIG. 10A illustrates a screen image before a window is moved between displays. Display B is the same screen image as that illustrated in FIG. 8D, and displays windows A, B, and D of FIG. 4 as mentioned previously. FIG. 10A illustrates a case where window F (window of navigation application) of FIG. 4 displayed on display A moves to display B. Note that, an assumption is made that display B is located on the right side of display A as the physical installation positions of displays A and B.

FIG. 10B illustrates a situation where a touch operation is made on display A, and a drag operation to move window F to the screen edge of display A is made (right side edge in the illustrated example). More specifically, the direction of the drag operation is a direction toward display B. The display control apparatus connected to display A determines that window F has moved to the outside of the display region of the display based on the user operation information and thus sends an indication of the movement of window F to the display control apparatus to which display B is connected.

Display control section 1002 of the display control apparatus to which display B is connected receives the indication of the movement of window F of FIG. 4 (window of navigation application) from the other display control apparatus to which display A is connected. Since window F is a moving window from another apparatus (S601: Yes), display control section 1002 of the display control apparatus to which display B is connected indicates the information on the moving window and sends a query to layout determining section 1007.

Layout determining section 1007 performs the determination process (S603) illustrated in FIG. 7. Window F in this example has a size of 200×200, does not allow user operations and is a window generated by anther apparatus, so that window F can be displayed in region 3 of pattern 1. However, window D already displayed in region 3 has a higher priority than window F to be newly displayed, so that layout determining section 1007 determines that window F to be newly displayed cannot be displayed in region 3 (S702: No).

Since window F to be newly displayed cannot be displayed with the layout pattern currently in use, layout determining section 1007 determines whether there is an appropriate layout pattern exists (S704). Layout storage section 1008 is assumed to have layout patterns 1 and 2 of FIGS. 5A and 5B.

Layout determining section 1007 selects layout pattern 2 as another layout pattern and determines whether all the windows including windows A, B, and D, which are currently displayed, and window F to be newly displayed can be displayed.

Layout determining section 1007 determines that windows A, B, D, and F cannot be displayed on layout pattern 2 with the current display size.

Layout determining section 1007, however, determines that windows A, B, D, and F can be displayed in regions 2, 3, 4, and 1, respectively, when the size of the window is changed to 100×100, which is indicated as a changeable size for window A (S704: Yes).

As a result of this determination, layout determining section 1007 changes the layout pattern currently in use (layout pattern 1) to layout pattern 2 (S705).

Layout determining section 1007 associates the display regions of windows A, B, D, and F with regions 2, 3, 4, and 1, respectively, and indicates the information to display control section 1002 (S706).

Since the window can be displayed (S604: Yes), and the layout pattern has been changed (S605: Yes), display control section 1002 generates display data (S607) in accordance with the contents indicated by layout determining section 1007. Windows A, B, D, and F are displayed in regions 2, 3, 4, and 1, respectively. Note that, the size of window A needs to be changed from 200×200 to 100×100.

Display control section 1002 changes the size of window A, and the application that draws the contents of window A (speed meter application) updates the display contents of window A (see FIG. 8E). FIG. 10C is a screen image after the window is moved between the displays. Window F that had been displayed on display A has been moved to display B.

Note that, in this embodiment, it is determined that, in the region where a window moving from another apparatus can be displayed, a window can be displayed regardless of whether the window generation source is the host apparatus or another apparatus. It is also possible to employ a configuration in which, in the region where a window moving from another apparatus can be displayed, only a window moving from another apparatus can be displayed, in order for the user to easily identify a window moving from another apparatus by the display position on the display. Moreover, it is determined that the region where user operations are allowed can display both windows where user operations are allowed and are not allowed. However, in order for the user to easily identify a window where user operations are allowed, by the display position on the display, it is possible to employ a configuration in which the region where user operations are allowed can display only a window where user operations are allowed.

Note that, in this embodiment, a configuration is employed in which the layout pattern is changed when all the windows cannot be displayed on the layout pattern currently in use due to an increase in the number of windows to be displayed. Reversely, it is also possible to change the layout pattern at the occurrence of a region where nothing is displayed as being a trigger when the number of windows to be displayed decreases, in order that all the windows currently being displayed can be displayed and that the number of regions where nothing is displayed can be reduced. Moreover, it is also possible to allow the user to explicitly designate the layout pattern to be used and thus to change the layout pattern, accordingly.

Moreover, in this embodiment, the window size of the moving source is used without any change in the moving destination. However, when the number of pixels per unit area differs between the displays of the moving source and the moving destination, the window sizes may be changed according to the ratio of the numbers of pixels, so that the display areas on the displays can be the same when the user sees the displays. In addition, when the distances between the user and displays are different, the window size can be multiplied by the ratio according to the distance between the user and displays, so that the windows can have the same sizes when the user sees the screens by the naked eye.

In addition, in this embodiment, when the region of a window to be newly displayed is determined while an already displayed window exists, a window having a higher priority or a window to be newly displayed that has the same priority is displayed. When the window that has been displayed becomes undisplayed as a result of being placed behind another window, no particular processing is performed. When a window sent from another apparatus is hidden behind the window and undisplayed, the undisplayed window can be sent back to the display control apparatus of the moving source via transmitting section 1006. The display control apparatus of the moving source can redisplay the undisplayed window in the same manner as before movement of the window. Note that, the information before movement of the window that is used for redisplaying the window in the same manner as before movement is held as the management information on the window. The information before movement includes an ID for identifying the moving source device, and the region where the window had been displayed in the layout pattern of the device before movement, or the display position and display size.

Moreover, in this embodiment, as an operation to move a window, a touch operation on a display and a drag operation to move the window to a screen edge are used. However, it is also possible to employ a sensor apparatus as the input apparatus to allow the user to input a drag operation by a noncontact operation (such as gestures). It is also possible to employ a pointer input apparatus such as a mouse or a remote controller, as the input apparatus, to allow the user to designate the moving window and moving destination display (information processing apparatus including a display control apparatus) by a pointing operation of the user. Moreover, a menu screen may be displayed on a display by a key operation, for example, and the moving window and moving destination display (information processing apparatus including a display control apparatus) may be selected from the menu screen.

According to the configuration, the layout patterns each defining the arrangement of windows on a display are previously held, and the display position for displaying a moving target window can be determined using this layout pattern. Thus, it is possible to appropriately control the placement of a moving target window after movement of the window, without designation of a display positon on the moving destination display by the user during an operation to move a window between displays.

There is a situation where an operation over two displays is difficult due to the installation conditions of the displays such as when the displays are placed distant from each other. The user is allowed to perform an operation to move a window between displays using an input operation on at least one of the displays regardless of the installation conditions of the displays. The user performs the operation to move a window on the moving source display and thus can appropriately control the placement of the moving target window after the window moves, without performing any operation on the moving destination display.

(Embodiment 2)

Figure 11:
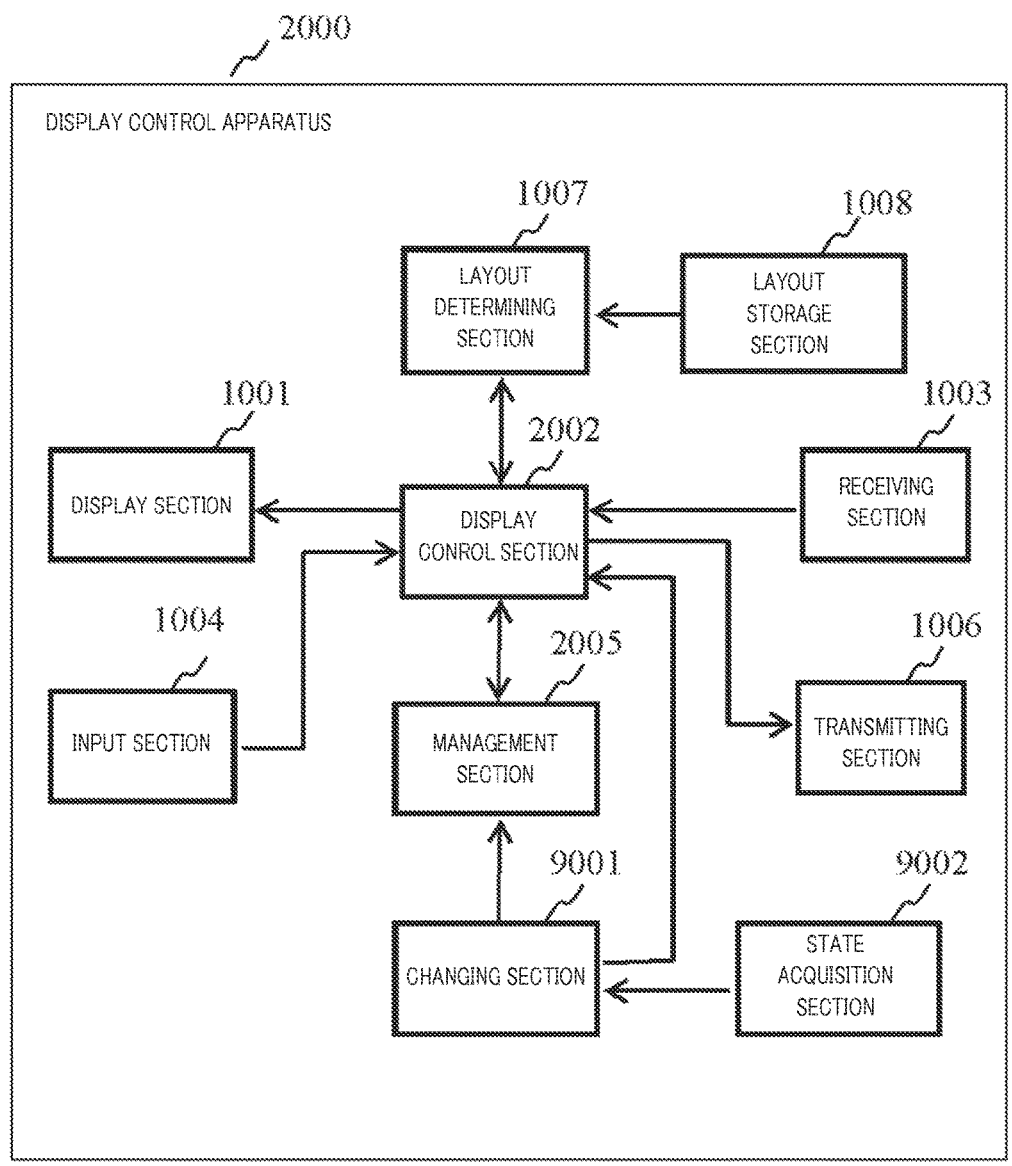
FIG. 11 is a block diagram illustrating a configuration example of a display control apparatus in an embodiment of the present invention.

FIG. 11 is a block diagram illustrating the configuration of a display control apparatus in Embodiment 2 of the present invention. The display control apparatus is a program that operates via CPU 10 using memory apparatus 20 illustrated in FIG. 2.

Display control apparatus 2000 outputs the contents (contents to be represented to the user) outputted from at least one application that operates on an information processing apparatus to a display as display data, thereby controlling the display contents of the display.

Display control apparatus 2000 manages data to be displayed on a display in window units, which are virtual regions for displaying data.

Display control apparatus 2000 associates a single window with a single application and draws the contents outputted from the application program on the associated window (virtual region).

Display control apparatus 2000 determines the display positon and display size for each widow under management and outputs the display data for which a window is placed at the determined display position, thereby controlling the contents on the display.

Note that, display control apparatus 2000 may associate two or more windows with a single application. Moreover, display control apparatus 2000 allows a moving operation on a display in window units.

Display control apparatus 2000 includes display section 1001, input section 1004, display control section 2002, management section 2005, receiving section 1003, transmitting section 1006, layout determining section 1007, layout storage section 1008, changing section 9001, and state acquisition section 9002. Note that, the configuration elements in FIG. 11 that the same as those in FIG. 3 are denoted by the same reference numerals, and a redundant description will be omitted.

State acquisition section 9002 acquires system states via a variety of sensors, for example. As described above, the display control system of the present invention is an in-vehicle system and includes a plurality of displays and outputs the contents to be presented to the user as display data, thereby displaying the contents on the plurality of displays. Upon determining that there is a change in the system state from the acquired system state, state acquisition section 9002 indicates the change to changing section 9001.

In the case of an in-vehicle system, for example, the running state of the vehicle is detected via a vehicle sensor such as a speed sensor, and when the state changes from a parked state to a running state, for example, the content of the change is indicated to changing section 9001.

Changing section 9001 receives the content of the change in the system state from state acquisition section 9002 and performs processing. Changing section 9001 changes management information on windows saved in management section 2005, in accordance with the indicated content of the change in the state. In the case of an in-vehicle system, for example, the operation in the running state needs to be regulated for ensuring the safety of drivers. The display control apparatus in the embodiment performs a display control such as prohibiting an operation of a specific application or deleting a display content not directly related to driving in accordance with the running states of the vehicle, such as a parked state and running state.

In order to perform this display control, when the running state of the vehicle, for example, is indicated by state acquisition section 9002 as a system state, changing section 9001 changes the management information (whether operations are allowed, display priority) for the window saved by management section 2005 in accordance with the indicated state. Changing section 9001 requests display control section 2002 to redisplay the window for which the management information has been changed.

Management section 2005 holds management information for windows under management of display control apparatus 2000. Display control apparatus 2000 manages data displayed on a display in window units, which are virtual regions for displaying windows. Moreover, display control apparatus 2000 includes a drawing buffer for a window and holds the contents (contents to be presented to the user) outputted from an application program, as the drawing data.

In addition, management section 2005 in Embodiment 2 is different from Embodiment 1 in that the management information on the saved windows is changed by changing section 9001.

Display control section 2002 determines the display position and display size on a display for each window under management, in accordance with the user operation information indicated by input section 1004. Display control section 2002 generates display data for which a window is placed at the determined display position, thereby controlling the contents of display data outputted from display section 1001.

Note that, display control section 2002 sends a query to layout determining section 1007 before generating and displaying a new window and determines the display positions and display sizes on a display for display target windows including a new window.

In addition, when determining that the display position of a window under management has moved to the outside of the display region of the display based on the user operation information indicated by input section 1004, display control section 2002 performs processing for moving a window between displays.

First, display control section 2002 requests transmitting section 1006 to indicate moving of a moving target window to another display control apparatus which is the moving destination. Next, display control section 2002 generates display data not including the moving target window and requests display section 1001 to output the generated display data. Note that, display control section 2002 may send a query to layout determining section 1007 before generating the display data not including the moving target window and determine again the display position and display size on the display for another window not including a moving target window.

In addition, display control section 2002 receives an indication of the movement of a window from another display control apparatus, via receiving section 1003. Display control section 2002 determines that the display positon of a window under the management of another display control apparatus has moved to a display region of a display under the management of the host apparatus and performs processing to move a window between displays.

First, display control section 2002 receives an indication of the movement of a window from another display control apparatus, which is the moving source, from receiving section 1003. Next, display control section 2002 sends a query about the display positon for displaying the moving window to layout determining section 1007. Next, display control section 2002 receives a result of determination made by layout determining section 1007 and determines the display position and display size on a display for the moving window. Display control section 2002 generates display data for which the moving window is placed at the determined display position, thereby controlling the contents of display data outputted from display control section 1001.

Note that, display control section 2002 in Embodiment 2 is different from Embodiment 1 in that display control section 2002 is requested by changing section 9001 to display again the window for which the management information has been changed. Display control section 2002 generates display data not including the window for which redisplaying of the window has been requested and requests display section 1001 to output the generated display data. Accordingly, the window for which redisplaying of the window has been requested is undisplayed.

Next, display control section 2002 sends, to layout determining section 1007, a query about the display position for displaying a window for which redisplaying of the window has been requested. Next, display control section 2002 receives a result of determination made by layout determining section 1007 based on the management information after the change and determines the display position and display size on the display for the window for which redisplaying of the window has been requested. Display control section 2002 generates display data for which the window requested to be redisplayed is placed at the determined display position, thereby controlling the contents of display data outputted from display control section 1001.

The processing to display a new window by the display control apparatus in Embodiment 2 is the same as the processing in Embodiment 1. Thus, the description of the processing will be omitted hereinafter.

Figure 12:
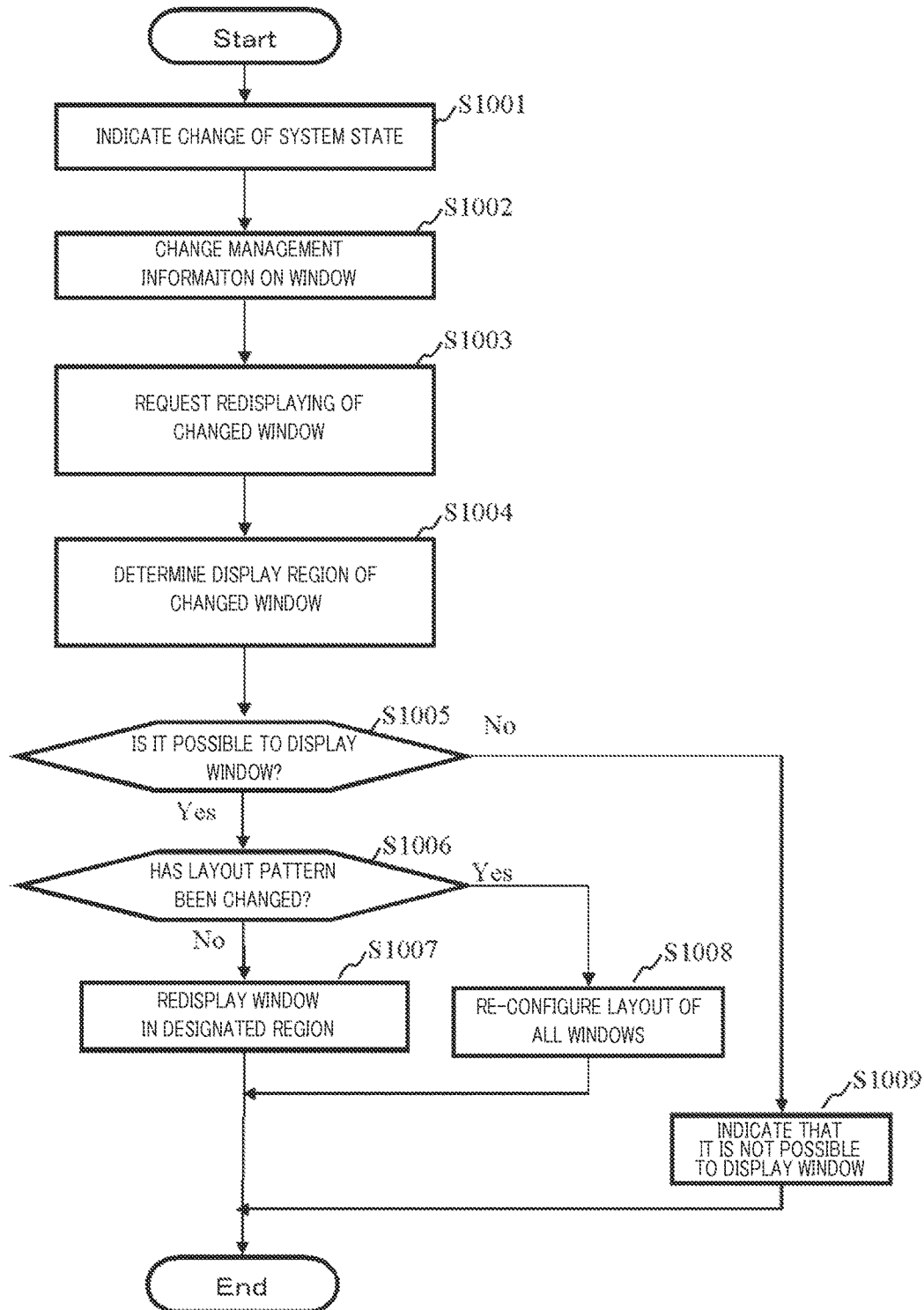
FIG. 12 is a flowchart illustrating an example of an operation to redisplay a window due to a change in system state by a display control apparatus in an embodiment of the present invention.

FIG. 12 is a flowchart illustrating an example of the operation to redisplay a window because of a change in system state in Embodiment 2 of the present invention.

First, upon determining that there is a change in system state, state acquisition section 9002 indicates the content of the change to changing section 9001 (S1001).

Next, changing section 9001 changes the management information (whether operations are allowed, display priority) for windows saved in management section 2005 (S1002).

Changing section 9001 requests display control section 2002 to display again the window for which management information has been changed (S1003). Display control section 2002 generates display data not including the requested window and requests display section 1001 to output the generated display data. Thus, the window for which redisplaying of the window has been requested is undisplayed.

Next, display control section 2002 indicates the information (information after the change by changing section 9001) on the window for which redisplaying of the window has been requested (window to be newly displayed) and sends a query to layout determining section 1007. Layout determining section 1007 determines the display region of the window to be newly displayed (the window for which redisplaying of the window has been requested) (S1004). The processing to determine the display region of a window is the same as that in Embodiment 1 and is described in details in FIG. 7. Accordingly, the detailed description of the processing will be omitted, hereinafter.

Next, layout determining section 1007 indicates to display control section 2002 the result of determination on the display region of the window to be newly displayed (the window for which redisplaying of the window has been requested). Display control section 2002 determines whether or not it is possible to display the window, based on the indicated result of determination (S1005). When the window can be displayed (S1005: Yes), display control section 2002 determines whether or not the layout pattern has been changed (S1006).

When the result of determination indicated by layout determining section 1007 is an error, display control section 2002 determines that the window cannot be displayed. When the result of determination indicated by layout determining section 1007 designates only the display region of the window to be newly displayed (the window for which redisplaying of the window has been requested), this means that the layout pattern has not been changed. When the result of determination indicated by layout determining section 1007 designates the display regions of all windows, this means that the layout pattern has been changed.

When the layout pattern has not been changed (S1006: No), display control section 2002 generates display data for which the window requested to be redisplayed is placed at the designated region in accordance with the display position and display size, which are the result of determination. Display control section 2002 outputs the generated display data to display section 1001, thereby redisplaying the window (S1007).

Note that, when the display size of the window before sending a query to layout determining section 1007 is different from the display size indicated as the result of determination from layout determining section 1007, the size of the window needs to be changed. Display control section 2002 generates display data in accordance with the display size indicated by layout determining section 1007.

Meanwhile, when the layout pattern has been changed (S1006: Yes), display control section 2002 receives the display positions and display sizes of all the windows as the result of determination. Display control section 2002 generates display data for which all the windows are placed at the designated regions in accordance with the result of determination. Display control section 2002 outputs the generated data to display control section 1001, thereby redisplaying the window (S1008).

Note that, when the display size indicated as the result of determination from layout determining section 1007 changes from the display size of the window before sending a query to layout determining section 1007, the size of the window needs to be changed. Display control section 2002 generates display data in accordance with the display size indicated by layout determining section 1007.

Meanwhile, when the window cannot be displayed (the result of determination is an error) (S1005: No), display control section 2002 indicates to the user that the window cannot be displayed (S1009). For example, display control section 2002 displays a message indicating that "designated window cannot be displayed at this time" on the display via display section 1001.

Note that, when there are a plurality of windows for which the management information has been changed in accordance with the changes in the system state, the processing from S1003 to S1009 is repeated for the number of windows.

Next, the processing flow for the case where management information on a window is changed because of a change in system state will be described using a specific example. For the sake of description, the following case is used as an example, where windows A, B, C, and D illustrated in FIG. 4 are displayed in the order named; the display contents on the display are transitioned from the states of FIGS. 8A to 8D; and the system state changes from the parked state to the running state. In this example, as the system state changes from the parked state to the running state, "Yes" for whether the operations are allowed for window D is changed to "No," while the display priority changes to −1.

State acquisition section 9002 detects that the running state of the vehicle has changed from the parked state to the running state, via the vehicle sensor. State acquisition section 9002 indicates that the system state has changed to the running state to changing section 9001 (S1001).

Next, changing section 9001 changes completion information on window D to "No" for whether the operations are allowed and the display priority −1 in response to the running state. More specifically, changing section 9001 previously holds setting conditions of whether the operations are allowed or not for each window and display priorities in each system state.

FIGS. 13A and 13B each illustrate an example of the setting conditions held by changing section 9001. FIG. 13A illustrates the setting conditions when the system state is the parked state. FIG. 13B illustrates the setting conditions when the system state is the running state.

Changing section 9001 updates the management information on each window using the previously held setting conditions and the system state (running state) indicated by state acquisition section 9002. FIG. 13B illustrates the setting conditions when the system state is the running state, and no change in management information occurs because windows A, B, and C among the windows A, B, C, and D are supposed to follow the setting contents of the applications. However, window D is a window that does not allow user operations and has the display priority −1, so that changing section 9001 changes the management information on window D, accordingly (S1002).

Changing section 9001 requests display control section 2002 to redisplay window D for which the management information has been changed (S1003). Display control section 2002 returns window D to the undisplayed state. Thus, window D displayed in region 3 becomes undisplayed and the screen state returns to the state of FIG. 8C in which window C is displayed in region 3.

Next, display control section 2002 indicates the information on window D and sends a query to layout determining section 1007. Layout determining section 1007 determines the display region of window D (S1004). Layout determining section 1007 executes the determination processing illustrated in FIG. 7. Window D has a size of 200×200, does not allow user operations, and is a window sent from another apparatus and has priority −1. Since window D has a size of 200×200, does not allow user operations, and is a window sent from another apparatus, window D can be displayed in region 3, but has a priority lower than the priority of window C, which is already displayed in region 3.

Layout determining section 1007 determines that the window cannot be displayed with the layout pattern currently in use (S702: No). When layout determining section 1007 holds layout pattern 2, layout determining section 1007 determines whether all windows can be displayed with layout pattern 2 (S704).

Layout determining section 1007 determines that windows D, B, A, and C can be displayed in regions 1, 2, 3, and 4 of layout pattern 2, respectively, as a result of determination using layout pattern 2 (S704: Yes). Meanwhile, when layout determining section 1007 does not hold layout pattern 2, layout determining section 1007 determines that window D cannot be displayed (S704: No). Layout determining section 1007 indicates the result of determination to display control section 2002.

When the display region in layout pattern 2 is indicated as a result of determination, the layout pattern is changed, so that the screen state becomes the state in FIG. 8F in which window D is displayed in region 1. The operations of the application are prohibited in region 2, so that any operation by drivers cannot be performed.

When an error is indicated as a result of determination, the screen state becomes the state in FIG. 8C in which window D is undisplayed while window C is displayed in region 3.

Note that, when an error is indicated as a result of determination, since window D is a window sent from another apparatus, window D may be sent back to the display control apparatus of the moving source. The display control apparatus of the moving source may determine the display region of returned window D by sending a query to layout determination section again or may redisplay returned window D at the position where window D had been displayed before the movement.

According to the configuration, the layout patterns each defining the arrangement of windows on a display are previously held, and the display position for displaying a moving target window can be determined using this layout pattern. Thus, it is possible to appropriately control the placement of a moving target window after movement of the window, without designation of a display positon on a display by the user during an operation to move a window between displays.

In addition, the setting conditions corresponding to the system states are previously held, and management information on each window is changed based on a change in the system state. Thus, the placement of the window can be appropriately controlled.

Note that, in this embodiment, the running state is used as the system state. The system state may be the remaining amount of battery, the running state of the engine, the abnormality detection state by a variety of vehicle sensors, or a risk state due to the presence of an obstacle around the vehicle, for example. In addition, the system state may be a traffic state around the vehicle such as running in a tunnel or in a traffic jam that is obtained by detecting the running position of the vehicle via a positioning apparatus such as a GPS. Moreover, the system state may be a condition around the vehicle obtained by a light sensor, for example.

In addition, it is also possible to send back all the windows sent from another apparatus to the moving source apparatus when the user performs a specific operation.

In addition, the display control system of the present invention may be a home network system including a combination of a plurality of home appliances. In addition, the display control system of the present invention may be an AV system including a combination of a plurality of AV appliances. Moreover, the display control system of the present invention may be a system including a combination of a plurality of devices including a mobile device such as a tablet terminal or mobile phone. In this case, the system state may be the remaining amount of battery, the available memory space, the connection state of a peripheral device, or the communication condition, for example. Moreover, the system state may be the position of a device acquired by a positioning device such as a GPS. Furthermore, the system state may be a peripheral condition of the device acquired via a light sensor, for example.

The disclosure of the specification, drawings, and abstract in Japanese Patent Application No. 2012-164325 filed on Jul. 25, 2012 is incorporated herein by reference in its entirety.

INDUSTRIAL APPLICABILITY

The display control apparatus according to the present invention is useful as an in-vehicle system including a plurality of displays and including a function to previously hold a layout pattern defining a window arrangement on a display and a function to determine a display position of a moving target window using this layout pattern, for example. In addition, the display control apparatus according to the present invention can be applied to a home network system including a combination of a plurality home appliances, an AV system including a combination of a plurality of AV appliances, and a system including a combination of a plurality of devices including a mobile terminal such as a tablet terminal or a mobile phone, for example.

REFERENCE SIGNS LIST 1, 2 Information processing apparatus
3, 4 Display
5 Network
10 CPU
20 Memory apparatus
21 ROM
22 RAM
25 Hard disk apparatus
31 Portable recording medium
32 Reading and writing apparatus
40 Input apparatus
45 Display apparatus
50 Bus line
1000, 2000 Display control apparatus
1001 Display section
1002, 2002 Display control section
1003 Receiving section
1004 Input section
1005, 2005 Management section
1006 Transmitting section
1007 Layout determining section
1008 Layout storage section
9001 Changing section
9002 State acquisition section

The invention claimed is:

1. A display control apparatus that controls display contents on a first display, the apparatus comprising:
 a storage memory medium configured to store steps of a control program;
 a processor that executes the steps of the control program, the processor having a plurality of sections configured to:
  determine, when moving indication information indicative of moving a moving target window displayed on a second display that is different from the first display to the first display is received, whether the moving target window is possible to be displayed on a display region for the first display based on whether a user operation for an application corresponding to the display region is allowed or not; and
  generate display data for displaying the moving target window in accordance with the determined result,
 wherein the display control apparatus is equipped on a vehicle; and
 whether the user operation for the application corresponding to the display region is allowed or not is checked in accordance with running states of the vehicle.

2. The display control apparatus according to claim 1, wherein the plurality of sections is further configured to:
 hold a plurality of layout patterns; and
 when determining that it is not possible to display the moving target window on the layout pattern currently in use among the plurality of the layout patterns, select another layout pattern from among the plurality of layout patterns, determine whether it is possible to display the moving target window on the display region defined by the selected layout pattern.

3. The display control apparatus according to claim 2, wherein:
 the moving target window has a displayable size that is different from a current display size; and
 the plurality of sections is further configured to:
  when determining that it is not possible to display the moving target window in the current display size based on the layout pattern, select a size that allows the moving target window to be displayed on the display region from among displayable sizes, and then determine a display position and display size of the moving target window; and
  change the size of the moving target window in accordance with the determined display size.

4. The display control apparatus according to claim 3, wherein the plurality of sections is further configured to:
 change the display contents on the moving target window based on the determined display size.

5. The display control apparatus according to claim 1, wherein the plurality of sections is further configured to:
 acquire a state of a system that includes the display control apparatus and that detects a change in the state of the system;
 change management information on a plurality of window units displaying display target data on the first display, in accordance with the state of the system; and
 determine, when the management information is changed, whether it is possible to display the moving target window on the display region using the changed management information.

6. The display control apparatus according to claim 5, wherein the state of the system is a running state of the vehicle; and
 the plurality of sections is further configured to:
  detect a change in the state of the vehicle between a parked state and a moving state of the vehicle.

7. The display control apparatus according to claim 1, wherein the plurality of sections is further configured to:
 when determining that it is not possible to display the moving target window, display the moving target window on the second display.

8. A display control system comprising: a first display; a display control apparatus that controls display contents on the first display; and a second display, wherein
 the display control apparatus includes:
  a first storage memory medium configured to store steps of a control program;
  a first processor that executes the steps of the control program, the processor having a plurality of sections configured to:
   determine, when information indicative of moving a moving target window displayed on a second display that is different from the first display to the first display is received, whether the moving target window is possible to be displayed on a display region for the first display based on whether a user operation for an application corresponding to the display region is allowed or not; and
   generate display data for displaying the moving target window in accordance with the determined result,
  wherein the display control apparatus is equipped on a vehicle; and
  whether the user operation for the application corresponding to the display region is allowed or not is checked in accordance with running states of the vehicle.

9. The display control apparatus according to claim 1, wherein the plurality of sections is further configured to:
 hold at least one layout pattern which defines display region for each window to be displayed on the first display; and
 determine, when the moving indication information is received, whether it is possible to display the display region using management information and the layout pattern, the management information including user operation availability information indicating whether the user operation for the application is allowed or not.

10. The display control apparatus according to claim 1, wherein whether the user operation is allowed or not is defined for a kind of the application.

11. The display control apparatus according to claim 9, wherein the layout pattern includes displaying availability information indicating that it is not possible to display the moving target window but it is possible to display a window generated by the display control apparatus.

12. The display control apparatus according to claim 11, wherein the plurality of sections is further configured to:
  determine whether it is possible to display the moving target window on the display region, using the management information and the layout pattern including the displaying availability information.

13. A display control method performed by a display control apparatus that controls display contents on a first display, the method comprising:
  determining, when moving indication information indicative of moving a moving target window displayed on a second display that is different from the first display to the first display is received, whether the moving target window is possible to be displayed on a display region for the first display based on whether a user operation for an application corresponding to the display region is allowed or not; and
  generating display data for displaying the moving target window in accordance with the determined result,
  wherein the display control apparatus is equipped on a vehicle; and
  whether the user operation for the application corresponding to the display region is allowed or not is checked in accordance with running states of the vehicle.

14. A non-transitory computer-readable medium having instructions stored thereon configured to perform the following steps, when executed by a processor:
  determining, when moving indication information indicative of moving a moving target window displayed on a second display that is different from the first display to the first display is received, whether the moving target window is possible to be displayed on a display region for the first display based on whether a user operation for an application corresponding to the display region is allowed or not; and
generating display data for displaying the moving target window in accordance with the determined result,
  wherein the processor is equipped on a vehicle; and
  whether the user operation for the application corresponding to the display region is allowed or not is checked in accordance with running states of the vehicle.

* * * * *